March 5, 1935.  P. R. CRUTCHER  1,993,649
FERTILIZER DROPPING MECHANISM FOR SEED DRILLS
Filed Oct. 13, 1931  3 Sheets-Sheet 1

March 5, 1935. P. R. CRUTCHER 1,993,649
FERTILIZER DROPPING MECHANISM FOR SEED DRILLS
Filed Oct. 13, 1931 3 Sheets-Sheet 2
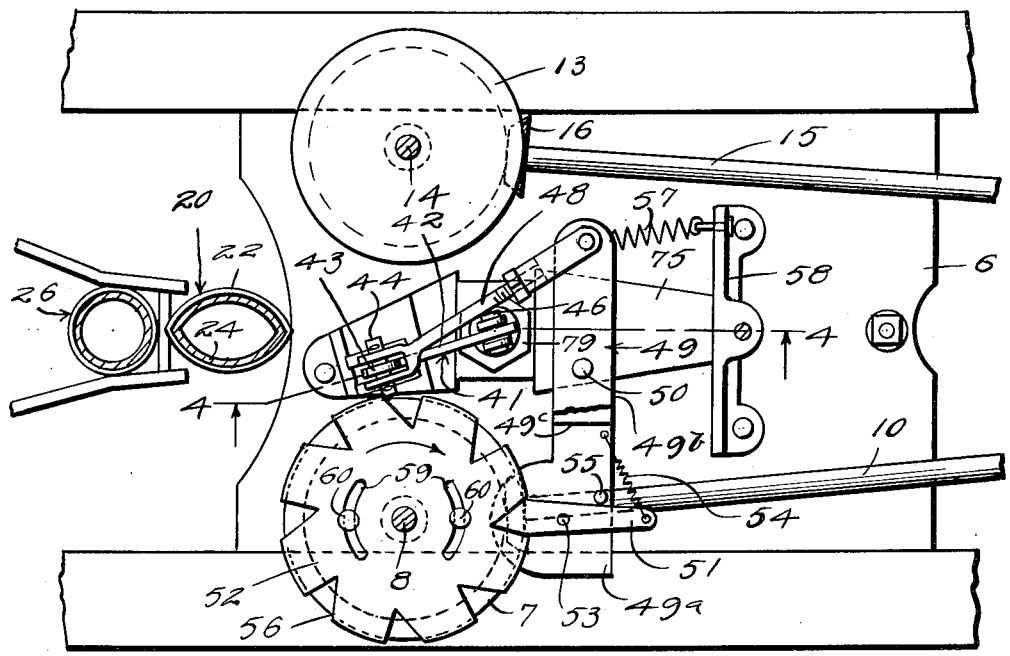
Fig. 2.
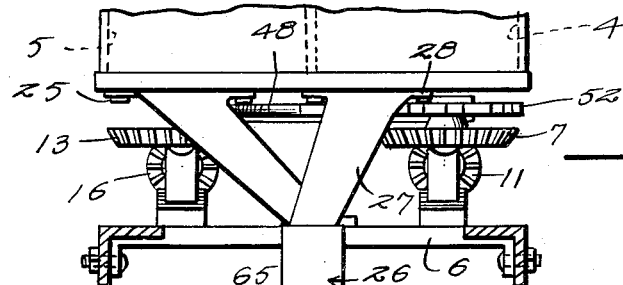
Fig. 3.
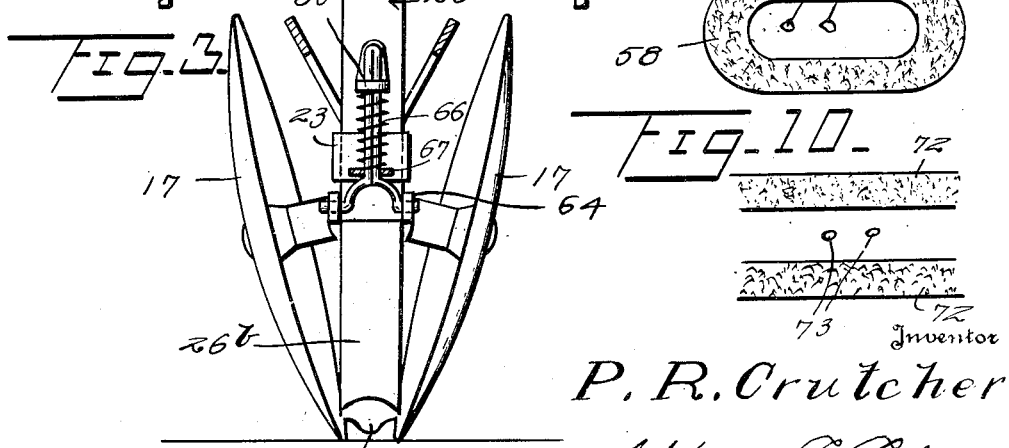
Fig. 9.
Fig. 10.
Inventor
P. R. Crutcher
By Watson E. Coleman
Attorney March 5, 1935.  P. R. CRUTCHER  1,993,649
FERTILIZER DROPPING MECHANISM FOR SEED DRILLS
Filed Oct. 13, 1931  3 Sheets-Sheet 3
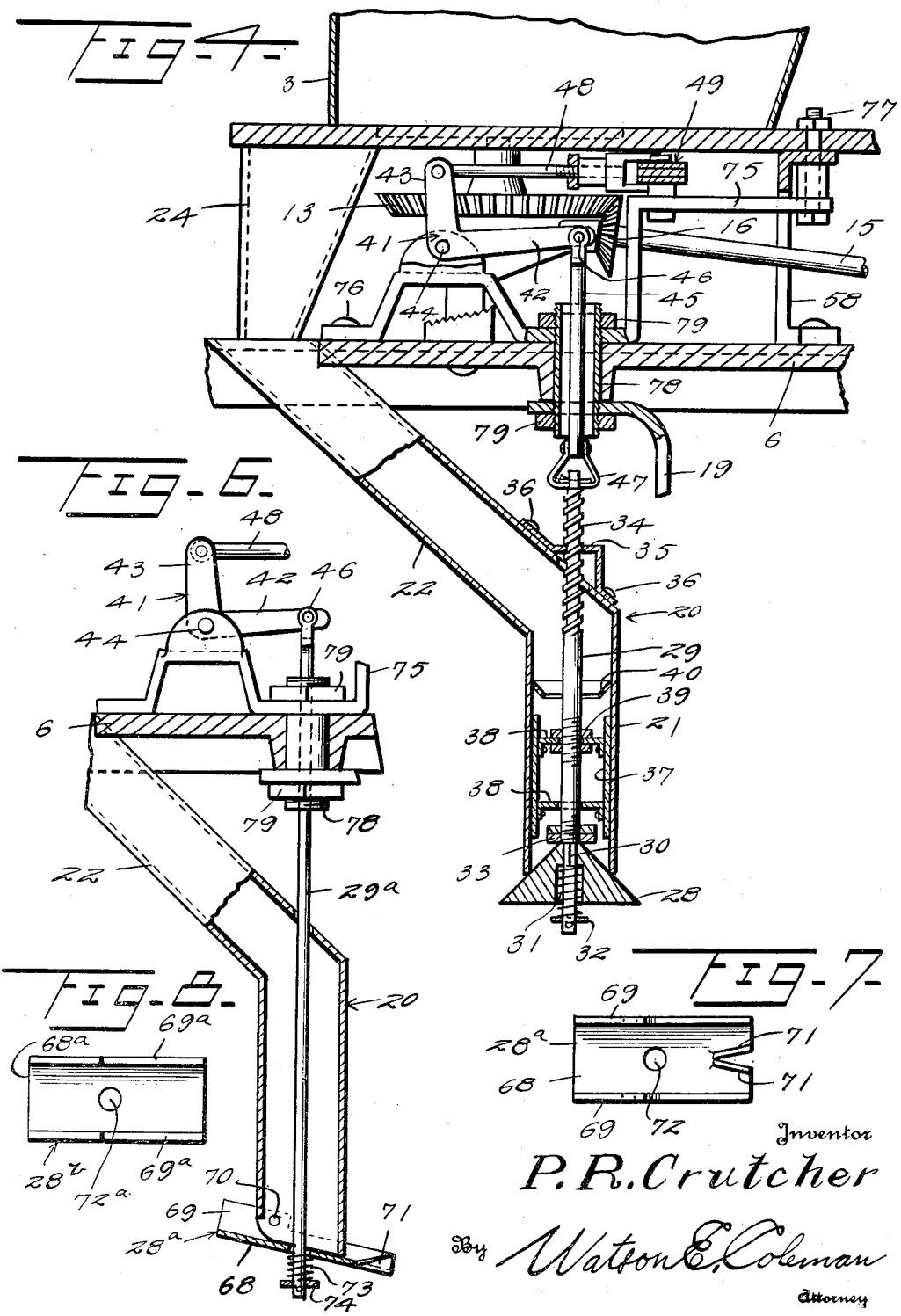
Inventor
P. R. Crutcher
By Watson E. Coleman
Attorney Patented Mar. 5, 1935

1,993,649

UNITED STATES PATENT OFFICE 1,993,649

FERTILIZER DROPPING MECHANISM FOR SEED DRILLS

Prentice R. Crutcher, Dickson, Tenn.

Application October 13, 1931, Serial No. 568,591

20 Claims. (Cl. 111—73)

This invention relates to seed drills, and more particularly to a fertilizer dropping mechanism for use in connection with seed drills having furrow openers in the form of discs or shoes.

The invention has for one of its objects to provide a novel, simple and highly efficient fertilizer dropping mechanism which may be applied to a seed drill easily and quickly and without making any material changes or alterations in the seed drill.

The invention has for a further object to provide a fertilizer dropping mechanism which shall be adapted to drop the fertilizer in the hill instead of in the row as is done by the fertilizer dropping mechanisms now employed.

The invention has for a further object to provide a fertilizer dropping mechanism which shall be adapted to operate in such timed relation to the seed feeding mechanism of the drill as to effect the depositing of the fertilizer before the depositing of the seed and in advance of the points at which the seed is deposited, to the end that the fertilizer may be covered by the soil at a depth greater than the depth at which the seed is planted and thus prevent the fertilizer from contacting and interfering with the germination of the seed.

The invention has for a further object to provide a fertilizer dropping mechanism which shall embody a valve adapted to drop the fertilizer in eliptical form, in the form of laterally spaced bands, or in lump form.

The invention has for a further object to provide a fertilizer dropping mechanism which embodies a tube adapted to convey the fertilizer from its hopper to the ground, a tube located rearwardly of the fertilizer tube and adapted to convey the seed from its hopper to the ground, a valve for controlling the discharge of the fertilizer from the fertilizer tube, and valve actuating means adapted to be opened by the seed feeding mechanism of the drill in such timed relation to such mechanism as to effect the dropping of the fertilizer before the dropping of the seed.

With the foregoing and other objects in view, the nature of which will appear as the description proceeds, the invention consists in the construction, combination and arrangement of parts hereinafter fully described and claimed, and illustrated in the accompanying drawings, wherein:—

Figure 2 is a sectional view taken on the horizontal planes indicated by the line 2—2 of Figure 1;

Figure 3 is a sectional view taken on the vertical plane indicated by the line 3—3 of Figure 1;

Figure 4 is a sectional view taken on the vertical planes indicated by the line 4—4 of Figure 2;

Figure 5 is a view partly in vertical section and partly in side elevation illustrating one of the levers of the fertilizer dropping mechanism and illustrating the manner in which the lever is mounted;

Figure 6 is a view partly in side elevation and partly in vertical section illustrating a slightly modified form of valve for controlling the discharge of the fertilizer from the fertilizer tube;

Figure 7 is a top plan view of this form of valve;

Figure 8 is a top plan view of a further modified form of the valve;

Figure 9 is a view illustrating the manner in which the valve shown in Figures 1 and 4 is adapted to drop the fertilizer, and Figure 10 is a view illustrating the manner in which the valve shown in Figures 6 and 7 is adapted to drop the fertilizer.

Figure 11 is a diagrammatic plan view of the bottom of the seed container, the seed plate and the fertilizer valve operating controlling plate, the latter being in dotted lines.

Figure 1:
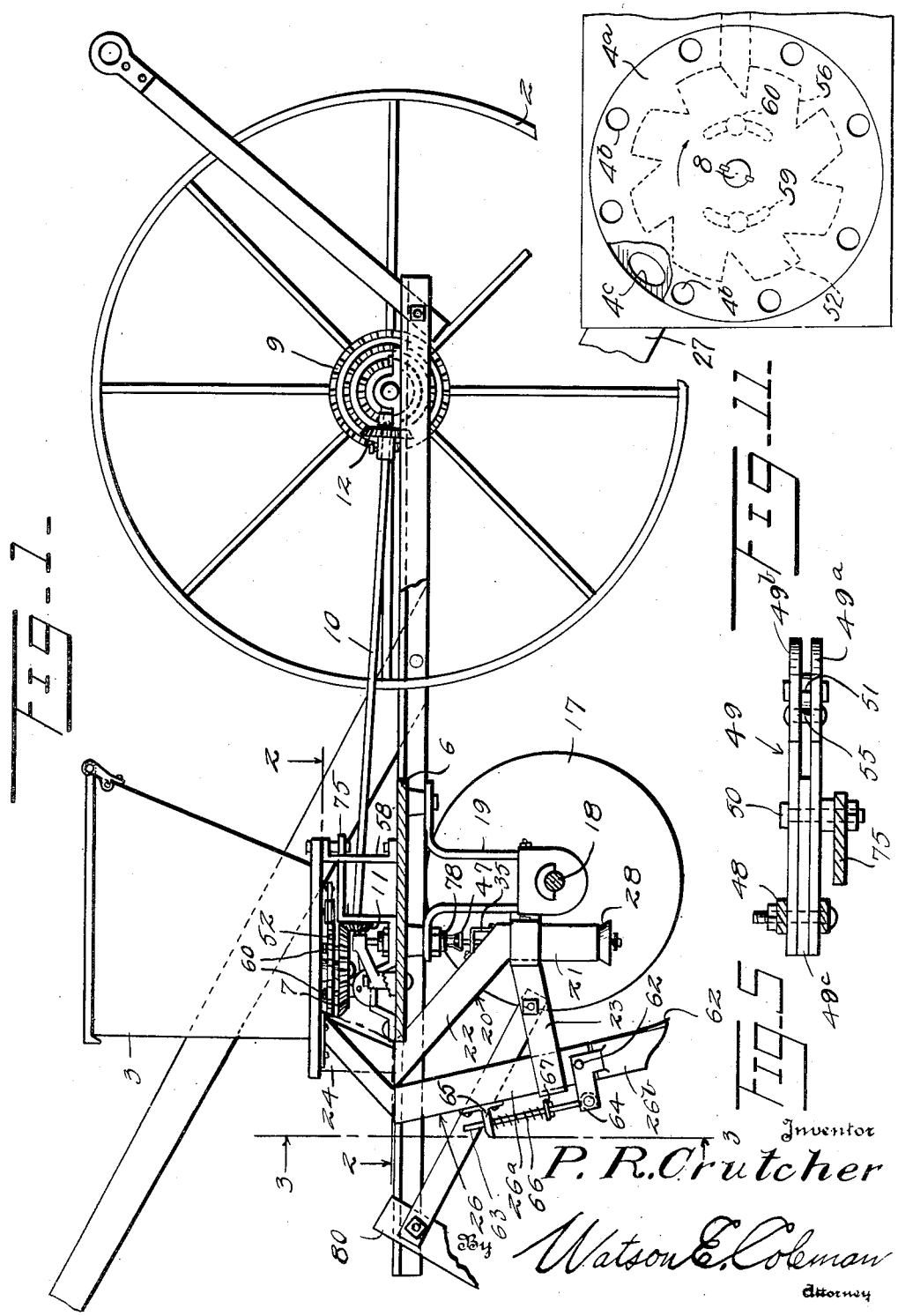
Figure 1 is a view partly in side elevation and partly in vertical section of a seed drill equipped with a fertilizer dropping mechanism embodying my invention.

Referring in detail to the drawings, 1 designates the frame, 2 the ground wheel, and 3 the hopper of a seed drill. The hopper 3 has a seed compartment 4 and a fertilizer compartment 5, and is supported in upwardly spaced relation from a plate or platform 6 carried by the frame 1 rearwardly of the wheel 2. The feeding mechanism for the seed, includes a rotatable seed plate 4ª disposed on the bottom of the seed compartment 4. This plate as usual has a series of discharge holes 4ᵇ while the bottom of the compartment has a single discharge opening 4ᶜ as shown diagrammatically in Figure 11. This seed plate is rotated by a shaft 8 carrying a gear 7 located below the hopper 3 and fixed to the shaft 8. The gear 7 is driven by a gear 9 fixed to the wheel 2, a seed plate driving shaft 10 extending from the gear 7 to the gear 9, a pinion 11 fixed to the shaft and meshing with the gear 7, and a pinion 12 fixed to the shaft 10 and meshing with the gear 9.

The gear 9 comprises three annular series of teeth, and the pinion 12 is connected to the shaft 10 in a manner to permit it to be arranged in engagement with any series of the teeth, to the end that the seed feeding mechanism may be operated at the required speed. The feeding mechanism for the fertilizer, not shown, is operated by means comprising a gear 13 located below the hopper 3 and fixed to the shaft 14 of said mechanism, a shaft 15 similar to the shaft 10, a pinion 16 fixed to the shaft 15 and meshing with the gear, and a pinion (not shown) similar to the pinion 12 and fixed to the shaft 15 and meshing with the gear similar to gear 9 fixed to the wheel 2. This pinion of the shaft 15 is also adjustable with relation to its wheel carried gear so that the fertilizer feeding mechanism may be operated at the required speed. Furrow opening discs 17 are journaled on a shaft 18 carried by a bracket 19 secured to and extending downwardly from the plate 6. The discs 17 are arranged in such angular relation that the front portions of their lower edges contact to the end that they may open the furrow and allow the furrow to close in rear of them.

The seed drill is of well-known construction, and only such parts thereof are illustrated and described as are necessary to obtain an understanding of the application and operation of the fertilizer dropping mechanism. This mechanism comprises a tube 20 having a vertically disposed lower portion 21 positioned between the rear portions of the furrow opening discs 17, and an upper portion 22 inclining upwardly and rearwardly from the upper end of the lower portion 21. The tube 20 is secured to the shaft bracket 19 by a bracket 23 which extends rearwardly beyond the tube for a purpose to be presently described.

A funnel 24 which is secured, as at 25, to the bottom of the hopper 3, communicates with the discharge opening of the fertilizer compartment 5 and the upper end of the tube 20. A seed tube 26 is located directly in rear of the fertilizer tube 20, and is carried by the bracket 23. The seed tube 26 occupies a downwardly and forwardly inclined position, and a funnel 27, which is secured, as at 28, to the bottom of the hopper 3, communicates with the discharge opening of the seed compartment 4 and with the upper end of the seed tube 26.

A conical valve 28 controls the discharge of the fertilizer from the tube 20, and is mounted for movement into closed and opened position with relation to the lower end of the vertical portion 21 of this tube. When the valve is in closed position it contacts with the lower end of the tube portion 21, and when in opened position it is spaced from the lower end of this tube portion. A rod 29 extends vertically and centrally through the tube portion 21, and is supported for vertical and rotary movements with relation to the tube portion. The valve 28 is mounted upon the lower end portion of the rod 29 in a manner to permit the valve and rod to have vertical movements with relation to each other. The valve 28 is provided with an axial opening 30 for the reception of the rod 29, and the upper portion of this opening, and that portion of the rod passing therethrough are of angular formation in cross section to hold the valve and rod against any relative rotary movement. The lower portion of the opening 30 is enlarged for the reception of a spring 31 which is sleeved upon the rod 29 between the valve and a seat 32 carried by the rod below the valve. The rod 29 is provided above the valve with a stop 33 against which the upper end of the valve 28 is held by the spring 31.

The upper portion of the rod 29 is screw threaded, as at 34, and this screw threaded portion passes through and engages the wall of an angular opening in a nut 35, to the end that the rod will rotate during the downward movement thereof to open the valve 28 and during the upward movement thereof to close the valve. The nut 35 is secured, as at 36, to the tube 20. A guide 37 for the rod 29 is of hollow cylindrical formation and is slidably mounted in the tube portion 21. The guide 37 has a snug contact with the wall of the cap portion 21, and is provided with spiders 38 through which the rod 29 passes and to one of which the rod is secured by nuts 39. A guard 40 of hollow frustro conical formation, is secured within the tube portion 21 above the highest position of the guide 37, and inclines downwardly from the wall of the tube portion to a point inwardly beyond the guide, to the end that fertilizer may not lodge between the guide and tube portion.

The rod 29 is moved downwardly and upwardly to open and close the valve 28 by means operated from the seed feeding mechanism, and comprising an elbow lever 41 located between the plate 6 and the hopper 3. The lever 41 is mounted at the juncture of its arms 42 and 43 for movement about a horizontal pivot 44 located rearwardly of the vertical plane coincident with the valve rod 29. The lever arm 42 extends forwardly from the pivot 44, and is connected at its front end by a link 45 to the upper end of the rod 29. The link 45 which passes freely through the plate 6, is pivotally connected, as at 46, to the lever arm 42, and is swivelly connected, as at 47, to the rod 29. The lever arm 43 extends upwardly from the pivot 44, and has its upper end connected by a link 48 to one end of a lever 49.

The link 48 comprises sections adjustably connected to permit the effective length of the link to be varied. The lever 49 is mounted at a point between its ends for rocking movement about a vertical pivot 50 located forwardly beyond the pivot 44 of the lever 41. The other or free end of the lever 49 is positioned opposite the gear 7 of the seed feeding mechanism, and pivoted between its ends thereto is a tooth 51 for cooperation with a notched disc 52 secured to the upper side of this gear. The lever 49 comprises a lower member 49a, an upper member 49b and an intermediate spacer 49c. The spacer 49c is shorter than the lever members 49a and 49b to support those end portions of the levers 49a and 49b nearest the gear 7, in relatively spaced relation. The tooth 51 is pivoted between these end portions of the lever members 49a and 49b for movement about a vertical axis 53, and it is normally held in right angular position with relation to the lever 49 by a coil spring 54 and a stop 55. The detent 51 extends forwardly from the disc 52, and the rear end thereof is of V-form. The spring 54 is secured to the lever 49 and to the front end of the tooth 51, the stop 55 is carried by the lever forwardly with relation to the pivot 53, and the spring normally holds the tooth against the stop. The disc 52 is provided with equally spaced peripheral notches 56 which are of V-form and into and out of which the V-end of the tooth 51 moves during the rotation of the disc. That end of the lever 49 carrying the tooth 51 is constantly urged in the direction of the disc 52 by a coil spring 57 which is secured to one end of the lever and to one of the supports 58 for the hopper 3.

The notches 56 are equal in number to the openings 4b in the plate 4a of the seed feeding mechanism but it will be seen from Figure 11 that the openings 40 are disposed rearward of the notches 56, and the disc 52 rotates in the direction indicated by the arrow of Figure 2 during the actuation of the seed feeding mechanism. During the rotation of the disc 52, the tooth 51 is forced out of the notch 56 engaged thereby, contacts with the edge of the disc located between this notch and the next notch, and then enters the next notch. The valve 28 is in opened position with relation to the lower or discharge end of the fertilizer tube 20 when the tooth 51 is engaged with one of the notches 56. The tooth 51 is moved forwardly from the notch engaged thereby, with the result that the remote end of the lever 49 is swung rearwardly against the tension of the spring 57. This movement of the lever 49 imparts a rearward movement to the link 48, and such movement of the link rocks the lever 41 in a direction to raise its arm 42. The upward movement of the lever arm 42 moves the valve 28 into closed position with relation to the discharge end of the fertilizer tube 20, and the valve is held in this position while the tooth 51 is in contact with the edge of the disc 52, and when the next notch 52 moves into alinement with the tooth 51 the lever 49 is released for swinging movement in the opposite direction by the spring 57. This movement of the lever 49 moves the link 48 forwardly, and this movement of the link moves the lever 41 in a direction to move its arm 42 downwardly. The downward movement of the lever arm 42 moves the valve 28 into opened position. It will thus be seen that the valve 28 will be closed while the tooth 51 is in engagement with the periphery of the disc 52, and that the valve will be opened when the tooth is in engagement with one of the notches 56 of the disc.

The yielding connection between the valve 28 and its rod 29, which is established by the coil spring 31, permits slight upward movement of the rod with relation to the valve after the valve has been closed against the discharge end of the fertilizer tube 20. Due thereto all danger of injury to the discharge end of the fertilizer tube 20, to the valve 28, and to the connection between the valve and its rod 29 is avoided.

As the rod 29 is screw threadedly engaged with the nut 35, the valve 28 is rotated in one direction during its movement into opened position and rotated in the opposite direction during its movement into closed position. Due to the movement of the machine, and to the conical formation of the valve 28, the fertilizer is dropped in the furrow in the form of an oval, as shown in Figure 9, wherein the fertilizer is designated 58. As will be seen from Figure 11, the notches 56 of the disc 52 bear such relation to the openings 4b in the plate 4a of the seed feeding mechanism, that the fertilizer will be dropped before the seeds are dropped. As will be seen from Figure 11, the holes 4b of the seed plate are disposed rearward of the notches 56. In this figure, the detent 51 is disposed in one of the notches 56 and in this position the fertilizer valve is open and the fertilizer is being discharged. Now the drill must travel a predetermined distance before the seeds are dropped in order that they may be dropped within the fertilizer. Therefore, the next hole 4b in the seed plate 4a to deliver seed at the right time must be a little rearward of the hole 4c in the bottom of the container. Thus, after the fertilizer has been deposited, then the seed is deposited. In order to enable this timed relation to be established between these mechanisms, the disc 52 is provided with arcuate slots 59 through which pass the bolts 60 by which the disk is secured to the gear 7 of the seed feeding mechanism, the slots permitting the disc to be adjusted angularly with relation to the gear. As the fertilizer is dropped before the seed is dropped, the fertilizer is deposited in the furrow in an oval pattern, and as the seed tube 26 is located rearwardly of the fertilizer tube 20, the seed will be deposited within and out of contact with the fertilizer, as shown in Figure 9, wherein the seed is designated 61.

It is desirable to explain that in order to plant corn, for instance, with this general type of drill, it is necessary to open a furrow with what is called a bull-tongue, laying off plow. As this plow travels along, a part of the loose soil falls back into the bottom of the furrow made by the plow, thus making a loose seed bed. It is this loose soil in the bottom of the furrow that the lower end of the drill tube travels through. The weight of the wheel 2 makes this wheel sink somewhat into the soil. The two discs 17 sink still deeper into the loose soil and thus a furrow will be opened only while the discs hold the soil on each side of the furrow apart. As the discs roll along this loose soil falls in behind by gravity and fills the furrow formerly held open by the disc. It is while the furrow is thus being held open that the fertilizer is dropped from the tube 21.

It will thus be seen that discs 17 open the furrow in advance of the fertilizer tube 20. The furrow closes rearwardly of the fertilizer tube 20, and is opened by the lower end of the seed tube 26 which to accomplish this purpose is provided with a shoe 62. The shoe 62 opens the furrow on a level above the dropped fertilizer. Thus the fertilizer is planted deeper than the seed, and that in view thereof and as the seed is planted within the dropped fertilizer, all possibility of the fertilizer contacting with the seed and interfering with the germination thereof is avoided.

The seed tube 26 is of sectional formation, the upper section 26a thereof being carried by the bracket 23 and the lower section 26b thereof being pivoted to the upper section, as at 63, so as to permit the lower section to yield rearwardly and upwardly should it encounter an obstruction in the furrow. The tube section 26b is normally held in alinement with the tube section 26a by means comprising a rod 63 pivoted at its lower end on a bracket 64 carried by the lower section 26b and sliding through a guide 65 on the upper section, and a coil spring 66 sleeved on the rod between the bracket and a seat 67 carried by the rod.

In Figures 6 and 7 there is illustrated a slightly modified form of valve for controlling the dropping of the fertilizer from the tube 20. This valve 28a comprises a flat plate 68 of elongated rectangular formation in plan and provided at its side edges with upstanding flanges 69. The plate 68 contacts with the lower end of the fertilizer tube 20 when the valve 28a is in closed position. To permit it to be swung downwardly into opened position, the valve 28a is pivoted through the medium of its flanges 69 to the tube 20, as at 70.

The valve plate 68 extends forwardly and rearwardly beyond the tube 20, and the pivots 70 thereof are located rearwardly of the vertical axis of the tube. When the valve 28a is open it occupies a downwardly and forwardly inclined position below the lower end of the tube 20, and the fertilizer slides downwardly therefrom into the furrow. The valve plate 68 is provided at its front end with upstanding lips 71 which are located between the flanges 69 and which converge rearwardly with their rear ends in contact. The lips 71 cause the fertilizer to leave the valve 28 in the form of laterally spaced bands in order to effect the dropping of the fertilizer into the furrow in a manner, as shown in Figure 10 wherein the fertilizer is designated 72. The seed will be deposited between the bands of fertilizer 72, as suggested in Figure 10, wherein the seed is designated 73. The depositing of the seed 73 between the bands of the fertilizer prevents the fertilizer from contacting with and interfering with the germination of the seed. While it is preferable to deposit the fertilizer in the form of an eliptical strip as shown in Figure 9 or in the form of two relatively spaced parallel bands as shown in Figure 10, the fertilizer may be deposited in a single elongated rectangular band without interfering with the germination of the seed due to the fact that the fertilizer is covered before the dropping of the seed and the seed is dropped in the furrow at a point above the fertilizer. To drop the fertilizer in the form of a lump the lips 71 are omitted from the valve, as suggested in Figure 8, wherein the valve is designated 28b, the plate 68a and the flange 69a.

The rod 29a for actuating the valve 28a or the valve 28b is smooth throughout its entire length. The lower end of the rod 29 passes through an opening 72 in the valve plate 68 or an opening 72a in the valve plate 68a, and a yielding connection is established between the rod and the valve 68 by a coil spring 73 which is sleeved on the rod between the lower side of the valve and the seat 74 carried by the rod. The other parts shown in Figure 6 are similar to the corresponding parts shown in Figures 1-4 and are designated by similar reference characters.

A bracket 75 is provided for the levers 41 and 49. The bracket 75 is mounted upon the plate 6, and is secured in place by bolts 76 and 77, and a sleeve 78 in nuts 79. The bolt 76 is engaged with the plate 6, and the bolt 77 is engaged with the bottom of the hopper 3. The sleeve 78 passes through the plate 6 and bracket 75, and nuts 79 are engaged with the sleeve bracket and plate. The link 45 passes through the sleeve 78. To adapt a seed drill for the application thereto of the fetrtilizer dropping mechanism, it is only necessary to remove the combined seed and fertilizer tube from the drill, and to remove from the drill the funnel for conveying the seed and fertilizer from the hopper to the tube. The fertilizer tube 20, the seed tube 26, and the funnels 24 and 27 may be readily applied to the drill. The bracket 75 and the parts carried thereby may be readily applied to the plate 6 of the drill after removing one or two bolts therefrom. The gear 7 and its disc 52 may be readily applied to the seed feeding mechanism shaft 8 after the removal of the gear from the shaft. The furrow closing means of the drill, which are not shown, are carried by the standard 80 shown in Figure 1, are not removed from the drill, in order that the furrow may be closed after the dropping of the seed.

From the foregoing description, taken in connection with the accompanying drawings, it should be understood that when the drill is in operation the disc 52 will be rotated, that the rotation of the disc 52 will rock the lever 49, that the rocking of this lever will rock the lever 41, and that the rocking of the lever 41 will open and close the valve controlling the discharge end of the fertilizer tube 20. When the valve 28 is used it will be rotated during its opening and closing movements to effect the dropping of the fertilizer in an oval pattern. When the valve 28a is used the fertilizer will be dropped in the form of laterally spaced bands, and when the valve 28b, is used the fertilizer will be dropped in the form of a lump. After the passing of the discs and dropping of the fertilizer the furrow will be closed, and it will be opened by the shoe 62 on a level above the fertilizer for the reception of the seed dropping from the tube 26. As the fertilizer is dropped before the dropping of the seed, as it is covered over before the dropping of the seed, and as the fertilizer is deposited at a depth below the planting of the seed, all possibility of the fertilizer interfering with the germination of the seed is avoided. If the planter should be moved rearwardly the pivoted tooth 51 will swing on its pivot 53 under the force applied thereto by the disc 52, with the result that the valve of the fertilzer dropping mechanism will not be operated. The application of the fertilizer dropping mechanism to the drill will not interfere with the working parts of the drill inasmuch as such mechanism merely controls the seed and fertilizer after they leave their respective compartments of the hopper.

As the disc 52 moves in timed relation to the seed dropping mechanism of the drill, the adjustment of the pinion 12 with relation to the gear 9 to increase or decrease the speed of operation of the seed feeding mechanism will not interfere with the operation of the valve to drop the fertilizer before the dropping of the seed.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In a seed drill, a fertilizer tube, a seed tube located rearwardly of the fertilizer tube, operating means for the seed feeding mechanism, a valve for controlling the discharge of fertilizer from the fertilizer tube, movable toward or from the end of the fertilizer tube, means operable by said first means to open and close the valve, and means for imparting rotation to the valve during the opening and closing movement thereof.

2. In a seed drill, a fertilizer tube, a seed tube located rearwardly of the fertilizer tube, operating means for the seed feeding mechanism, a valve for controlling the discharge of fertilizer from the fertilizer tube, a rod carying the valve and mounted for reciprocation to open and close the valve, means operable by said first means to reciprocate the rod, and means for turning the rod during the reciprocation thereof.

3. In a seed drill, a fertilizer tube, a seed tube located rearwardly of the fertilizer tube, operating means for seed feeding mechanism, a valve for controlling the discharge of fertilizer from the fertilizer tube, a rod carrying the valve and mounted for reciprocation to open and close the valve, means operable by said first means to reciprocate the rod, means for rotating the rod during the reciprocation thereof, and means for establishing a yielding and nonrotatable connection between the valve and rod.

4. In a seed drill, a fertilizer tube, a seed tube located rearwardly of the fertilizer tube, operating means for seed feeding mechanism, a rod extending vertically through the fertilizer tube, a valve carried by the rod and movable thereby into opened and closed position with relation to the lower end of the fertilizer tube, a guide for the rod connected thereto and slidably mounted in the fertilizer tube, a guard located within the fertilizer tube to prevent the fertilizer from lodging between the guide and tube, and means operable by said first means for actuating the rod to open and close the valve.

5. In a seed drill, a fertilizer tube, a seed tube located rearwardly of the fertilizer tube, operating means for seed feeding mechanism, a rod extending vertically through the fertilizer tube, a valve carried by the rod and movable thereby into opened and closed position with relation to the lower end of the fertilizer tube, a guide for the rod connected thereto and slidably mounted in the fertilizer tube, a guard located within the fertilizer tube to prevent the fertilizer from lodging between the guide and tube, means operable by said first means for actuating the rod to open and close the valve, and means for rotating the rod during the actuation thereof.

6. In a seed drill, a fertilizer tube, a seed tube located rearwardly of the fertilizer tube, operating means for seed feeding mechanism, a conical valve movable into and out of closed position with relation to the lower end of the fertilizer tube for controlling the discharge of fertilizer therefrom, means operable by said first means to open and close the valve, and means for rotating the valve during the opening and closing movements thereof.

7. In a seed drill, a fertilizer tube, a conical valve movable into closed and opened position with relation to the lower end of the tube to control the discharge of fertilizer therefrom, means for opening and closing the valve, and means for rotating the valve during the opening and closing thereof.

8. In a seed drill, a fertilizer tube, a seed tube located rearwardly of the fertilizer tube, operating means for seed feeding mechanism, a valve for controlling the discharge of fertilizer from the fertilizer tube, a notched disc secured to said operating means for rotation thereby, a lever pivoted between its ends with one end located opposite the notched disc, a spring constantly urging said end of the lever in the direction of the notched disc, a tooth carried by said end of the lever for movement into and out of the notches of the disc during the rotation of the latter, and means connecting the other end of the lever to the valve.

9. In a seed drill, a fertilizer tube, a seed tube located rearwardly of the fertilizer tube, operating means for seed feeding mechanism, a valve for controlling the discharge of fertilizer from the fertilizer tube, a notched disc secured to said means for rotation thereby, a lever pivoted between its ends with one end located opposite the notched disc, a spring constantly urging said end of the lever in the direction of the notched disc, a tooth carried by said end of the lever for movement into and out of the notches of the disc during the rotation of the latter, and a link connected to the other end of said first lever and to the other arm of said second lever.

10. In a seed drill, a fertilizer tube, a seed tube located rearwardly of the fertilizer tube, operating means for seed feeding mechanism, a valve for controlling the discharge of fertilizer from the fertilizer tube, a notched disc secured to said means for rotation thereby, a lever pivoted between its ends with one end located opposite the notched disc, a spring constantly urging said end of the lever in the direction of the notched disc, a tooth carried by said end of the lever for movement into and out of the notches of the disc during the rotation of the latter, a rod extending vertically through the fertilizer tube and connected to the valve, an elbow lever, means pivotally and swivelly connecting one end of the elbow lever to the rod, a link connected to the other end of said first lever and to the other end of said second lever, a rod having a screw threaded portion, and a nut carried by the fertilizer tube and engaging the screw threaded portion of the rod.

11. In a seed drill, a fertilizer tube, a seed tube located rearwardly of the fertilizer tube, operating means for seed feeding mechanism, a valve for controlling the discharge of fertilizer from the fertilizer tube, means operable by said first means to open and close the valve in such timed relation to the seed feeding mechanism as to effect the dropping of the fertilizer before the dropping of the seed, means for opening the furrow in advance of the fertilizer tube and permitting the furrow to close in rear of the tube, and furrow opening means carried by the seed tube for opening the furrow at a level above the covered fertilizer.

12. In a seed drill, a fertilizer tube, a seed tube located rearwardly of the fertilizer tube, operating means for seed feeding mechanism, a valve for controlling the discharge of fertilizer from the fertilizer tube, means operable by said first means to open and close the valve in such timed relation to the seed feeding mechanism as to effect the dropping of the fertilizer before the dropping of the seed, means for opening the furrow in advance of the fertilizer tube and permitting the furrow to close in rear of the tube, the seed tube having a pivoted lower portion provided with a furrow opening shoe, and means yieldingly maintaining said portion in alinement with the remainder of the seed tube, the furrow opening shoe disposed in a level above said first furrow opening means.

13. In a seed drill, a fertilizer tube, a seed tube located rearwardly of the fertilizer tube, operating means for seed feeding mechanism including a gear, a valve for controlling the discharge of fertilizer from the fertilizer tube, a notched disc carried by the gear and adjustable angularly with relation thereto, a lever pivoted between its ends, a spring constantly urging one end of the lever in the direction of the notched disc, a tooth carried by said end of the lever for movement into and out of engagement with the notches of the disc during the rotation of the lever and connecting the other end of the lever to the valve.

14. In a seed drill, a fertilizer tube, a seed tube located rearwardly of the fertilizer tube but in line therewith, means for operating seed feeding mechanism of the seed tube, a valve for controlling the discharge of fertilizer from the fertilizer tube, a notched disc rotated by said operating means, a lever pivoted between its ends with one end located opposite the notched disc, a spring constantly urging one end of the lever in the direction of the disc, a tooth pivoted upon said end of the lever and yieldingly held in a position to engage the notches of said disc, the tooth being movable into or out of the notches of the disc by the rotation of the disc, and means operatively connecting the other end of the lever to the valve.

15. In a seed drill, a fertilizer tube, a seed tube located rearwardly of the fertilizer tube, operating means for the seed feeding mechanism of the seed tube, a valve for controlling the discharge of fertilizer in the fertilizer tube, a notched disc rotated by said operating means, the notches of the disc being ratchet-shaped, a lever pivoted between its ends with one end located opposite the notched disc and having a bevel-ended tooth engaged by the notches in the disc, a spring constantly urging the toothed end of the lever in a direction toward the notched disc whereby as the disc rotates the inclined walls of the notches will force the toothed end of the lever outward until a second notch comes into registry with the tooth, and means connecting the other end of the lever to the fertilizer valve.

16. In a seed drill, a fertilizer tube, a pair of forwardly and downwardly converging discs, the fertilizer tube having its discharge mouth disposed rearwardly of the axis of the discs and between the discs whereby the fertilizer will be deposited in a furrow formed by said discs and will be covered by the earth falling into the furrow after the fertilizer discs have passed, a seed tube having its discharge mouth located rearward of the fertilizer tube and on a level above the lowest portion of the perimeters of the discs, operating means for the seed feeding mechanism, a valve controlling the discharge of fertilizer from the fertilizer tube, and means operable by the operating means for alternately opening and closing the valve in timed relation to the seed feeding mechanism.

17. In a seed drill, a fertilizer tube, a valve pivoted to the lower end of the tube for movement into closed or opened position with relation thereto to thereby control the discharge of fertilizer from the tube, the valve including a flat plate having side flanges and angularly related, inwardly convergent lips located between the flanges and at one end of the valve, and means for continuously oscillating the valve toward or from the end of the tube while the drill is being operated.

18. In a seed drill, means for depositing fertilizer below the surface of the ground in the form of two laterally spaced longitudinally interrupted bands, connected with each other at opposite ends to thus define an approximate oval, and means for depositing seed below the surface of the ground within the ovals defined by the fertilizer deposits but on a level above the level of the fertilizer deposits.

19. In a seed planter, a traction wheel, a fertilizer container and a seed container, a seed plate for the seed container, a discharge valve for the fertilizer container, a driving shaft for the seed plate and operatively driven from the traction wheel, and means actuated by the said driving shaft for intermittently operating the fertilizer discharge valve in advance of the seed plate but in time therewith.

20. In a seed planter, a traction wheel, a fertilizer container and a seed container, a discharge tube extending downward from the fertilizer container, a discharge tube extending downward from the seed container and disposed rearward of the fertilizer container, a seed plate for controlling the discharge of seed from the said container, a valve controlling discharge from said fertilizer discharge tube, a driving shaft carrying the seed plate, means actuated by said driving shaft for intermittently opening the fertilizer discharge valve, and a furrow opener disposed in advance of the fertilizer discharge tube and extending downward below the seed discharge tube.

PRENTICE R. CRUTCHER.